(12) United States Patent
Lee

(10) Patent No.: US 7,030,750 B2
(45) Date of Patent: Apr. 18, 2006

(54) DETACHABLE ENTRANCE AND EXIT GATE WITH A COMBINED COMMODITY BURGLARPROOFING AND SMALL ARMS DETECTING SYSTEM

(76) Inventor: Bert Taeho Lee, 214 Madison Ave., Cresskill, NJ (US) 07626

( * ) Notice: Subject to any disclaimer, the term of this patent is extended or adjusted under 35 U.S.C. 154(b) by 166 days.

(21) Appl. No.: 10/817,009

(22) Filed: Apr. 2, 2004

(65) Prior Publication Data

US 2004/0183669 A1    Sep. 23, 2004

Related U.S. Application Data

(63) Continuation-in-part of application No. 10/269,732, filed on Oct. 10, 2002, now Pat. No. 6,900,727.

(60) Provisional application No. 60/396,180, filed on Jul. 16, 2002.

(51) Int. Cl.
*G08B 19/00* (2006.01)

(52) U.S. Cl. .................. 340/521; 340/572.1; 340/522; 340/551; 340/693.5

(58) Field of Classification Search ............. 340/572.1, 340/521, 522, 551, 693.5, 541, 545.3, 552, 340/567, 561; 324/243, 558
See application file for complete search history.

(56) References Cited

U.S. PATENT DOCUMENTS

| | | | |
|---|---|---|---|
| 3,665,448 A | 5/1972 | McGlinchey et al. | |
| 4,251,808 A | 2/1981 | Lichtblau | |
| 4,357,535 A | 11/1982 | Haas | |
| 4,656,954 A | 4/1987 | Tonali | |
| 4,870,391 A | 9/1989 | Cooper | |
| 5,008,649 A * | 4/1991 | Klein | 340/572.3 |
| 5,039,981 A | 8/1991 | Rodriguez | |
| 5,121,103 A | 6/1992 | Minasy et al. | |
| 5,841,346 A | 11/1998 | Park | |
| 5,973,595 A * | 10/1999 | Scrivner et al. | 340/551 |
| 5,992,094 A | 11/1999 | Diaz | |
| 6,076,303 A | 6/2000 | Orsini | |
| 6,104,285 A * | 8/2000 | Stobbe | 340/505 |
| 6,308,644 B1 | 10/2001 | Diaz | |
| 6,362,739 B1 | 3/2002 | Burton | |
| 6,366,203 B1 | 4/2002 | Burns | |
| 6,507,278 B1 * | 1/2003 | Brunetti et al. | 340/541 |
| 6,686,846 B1 | 2/2004 | Lee | |

* cited by examiner

*Primary Examiner*—Anh V. La
(74) *Attorney, Agent, or Firm*—Cantor Colburn LLP

(57) ABSTRACT

A detachable entrance and exit gate with a combined commodity burglarproofing and small arms detecting system including a detachable entrance and exit gate with a pair of vertical type panels which are oppositely disposed inside of an entrance and exit door, a central processing unit connected with the transmitting and receiving signal frequency coil portions, an image-receiving device, a warning flare and a photographing device which are controlled by a central processing unit, where the small arms detecting transmitting coil portion and the commodity burglarproofing transmitting coil portion are interiorly installed at one side of the vertical type panel of the entrance and exit gate and the small arms detecting receiving coil portion and the commodity burglarproofing receiving coil portion RX2 are interiorly installed at one side of the other vertical type panel of the entrance and exit gate, so that a variation existing between a frequency zone of the small arms detecting transmitting and receiving coil portions and a frequency zone of the commodity burglarproofing transmitting and receiver coil portions can be largely established, thereby resulting in no mutual interference.

10 Claims, 2 Drawing Sheets

DETACHABLE ENTRANCE AND EXIT GATE WITH A COMBINED COMMODITY BURGLARPROOFING AND SMALL ARMS DETECTING SYSTEM

CROSS REFERENCE TO RELATED APPLICATIONS

This application is a continuation-in-part of U.S. patent application Ser. No. 10/269,732 filed on 10 Oct. 2002 and issued as U.S. Pat. No. 6,900,727, which claims the benefit of U.S. Provisional Patent Application No. 60/396,180 filed on 16 Jul. 2002, and the present application is related to U.S. Pat. No. 6,686,846, issued on 03 Feb. 2004, all of which applications are herein incorporated by reference in their entirety.

BACKGROUND OF THE INVENTION

1. Field of the Invention

The present invention relates to a detachable entrance and exit gate with a combined commodity burglarproofing and small arms detecting system, which is adapted to detect all kinds of small arms and prevent burglary of commodities as well. More precisely, the present invention relates to a detachable entrance and exit gate, which can simultaneously perform the function of a commodity burglarproof and small arms detection, while not giving uncomfortable feelings to general customers by installing integrally a combined commodity burglarproofing system and small arms detecting system in one gate. Herein and throughout, the term 'small arms' is used generally to mean all types of portable weapons such as, for example, revolvers and knives, etc.

2. Description of the Related Art

Currently, the purchase of small arms, such as pistol or a knife, etc., is conducted relatively freely and lawfully in some countries, therefore various criminal incidents arising from such small arms are on an increasing trend.

There have been a number of criminal incidents caused by such small arms in public places such as supermarket, 24 hours convenience store, liquor shop, school, bank, airport and government office. Therefore, in such places, an arched or latticed detecting gate is located inside the entrance and exit door equipped with the detecting system which detects any person bearing small arms among those who passes through the entrance.

According to conventional small arms detecting systems, most of detecting gates, which are arranged inside an entrance and exit door, comprise a pair of side panels with an arched or straight panel which connects the upper portion of the side panels to each other. These kinds of reverse U-shaped or latticed detecting gates impart tension to persons passing through the entrance and exit door. Further, ordinary persons who pass through the conventional detecting gate feel like they are entering a tunnel, so it imparts them an unpleasant feeling, thereby resulting in hesitation.

Therefore, by placing such conventional arched detecting gate in public places such as supermarket, 24 hours convenience store, liquor shop, school, bank, airport, government office in which the general customers frequently visit, it results in a psychological oppression sense as well as feeling of rejection to general customers passing through these gates.

Furthermore, since conventional commodity burglarproofing systems are badly constructed for general customers to use, thereby result in uncomfortable image to general customers.

In addition, since the entrance and exit gates equipped with a conventional small arms detecting and commodity burglarproofing system are installed separately at the entrance, thereby resulting in an excessive installation expense and a multiple installation. In addition, the customers and persons passing through the entrance and exit gates are suffered from a psychological sense of oppression and a feeling of rejection.

In Korean Utility Model Registration No. 298,223 granted in the name of this inventor and incorporated by reference herein in its entirety, it discloses that the shielding panels consisting of transmitting and receiving coil panels are provided for preventing an interference of electromagnetic field. However, such shielding panel has drawbacks since its production cost is too high due to its big size as a whole.

A conventional entrance and exit gate has also a drawback since its structure is too big, thereby resulting in increasing a setup area of such gate.

SUMMARY OF THE INVENTION

The present inventor has extensively studied to solve above problems. As a result, the present inventor has invented a detachable entrance and exit gate equipped with a combined commodity burglarproofing and small arms detecting system which may be disposed at the public places such as supermarket, 24 hour convenience store, liquor shop, bank, airport and government office and the like in which the general public visit frequently, while giving no psychological sense of oppression and no feeling of rejection to persons passing through the gate.

The present entrance and exit gate will also film any person bearing small arms passing through an entrance and exit gate or a person who possesses any stolen goods. After filming the suspect, it will promptly inform a counter girl and/or surveillant of the results with a warning flare and/or a warning sound, so that the criminal accidents caused by small arms may be prevented in advance and the stolen articles may be recovered. According to the present invention, it is possible to reduce an installation area of the detachable entrance and exit gate by a compacting of its structure.

In the context of the present invention, these advantages can be achieved by the following description. That is, a detachable entrance and exit gate with a combined commodity burglarproofing and small arms detecting system according to the present invention are comprised of as follows: a detachable entrance and exit gate with a pair of vertical type panel which are oppositely disposed at both inside of the entrance and exit door; a central processing unit connected with a transmitting signal frequency coil portion and a receiving signal frequency coil portion of this gate; an image-receiving device, a warning flare and a photographing device which are controlled by a central processing unit, characterized in that a small arms detecting coil portion and a commodity burglarproofing coil portion are installed at the vertical type panels of the above entrance and exit gate respectively, so that a variation existing between a frequency zone of small arms detecting transmitting and receiving coil portions and the one of commodity burglarproofing transmitting and receiving coil portions may be largely established, thereby resulting in no mutual interference.

BRIEF DESCRIPTION OF THE DRAWINGS

Other characteristic and advantages of the present invention appear on reading the following detailed description and on looking at the accompanying drawings, which are given by way of non-limiting example and in which.

DESCRIPTION OF THE PREFERRED EMBODIMENTS

Preferred embodiments of the present invention will be described hereinafter with reference to the accompanying drawings.

Figure 1:
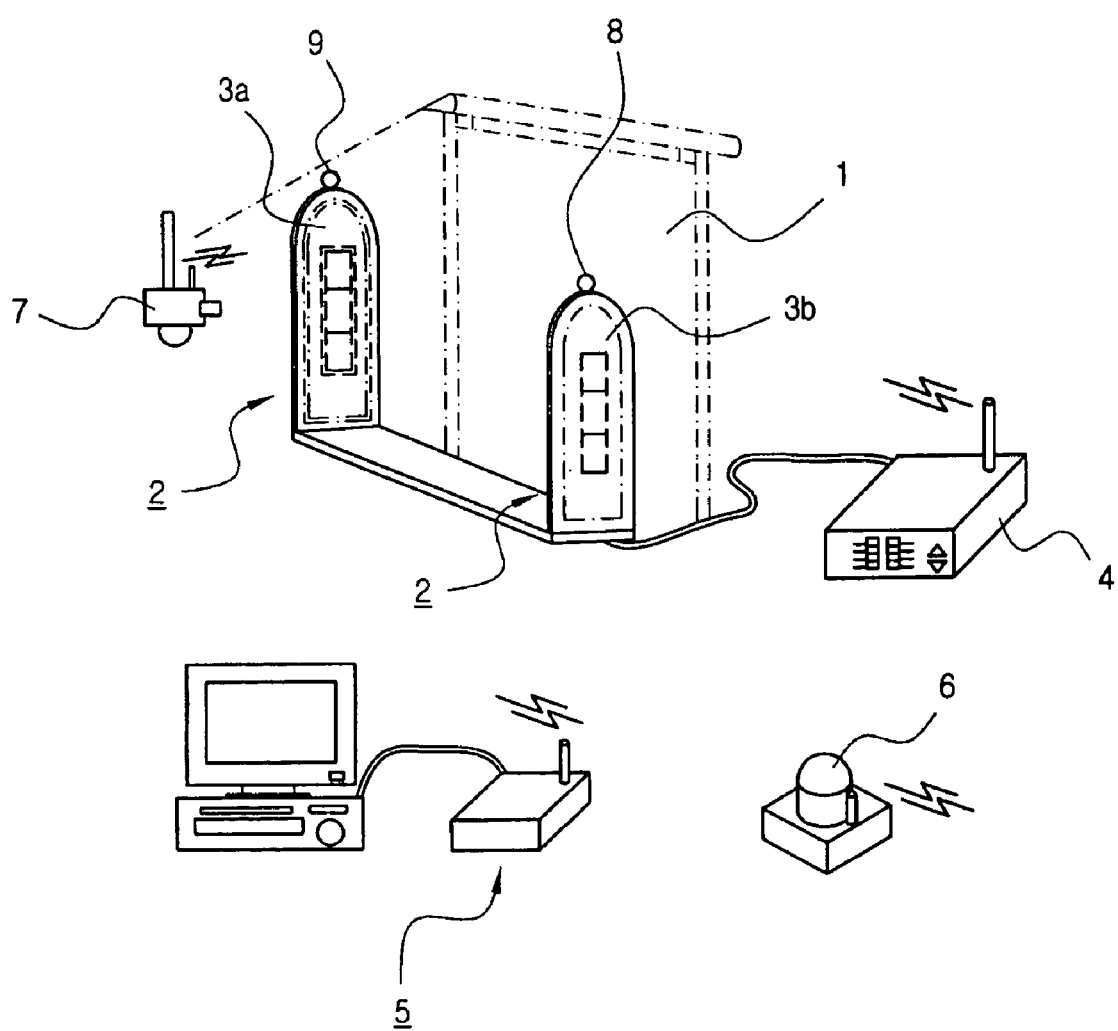
FIG. 1 is an overall constitution view of a detachable entrance and exit gate with a combined commodity burglarproofing and small arms detecting system according to the present invention.

In FIG. 1, a reference number 1 denotes an entrance and exit door; 2 denotes a detachable entrance and exit gate; 3a and 3b denote vertical type panels; 4 denotes a central processing unit (CPU); 5 denotes an image-receiving device; 6 denotes a warning flare; and 7 denotes a photographing device.

A detachable entrance and exit gate with a combined commodity burglarproofing and small arms detecting system according to the present invention comprising a detachable entrance and exit gate 2 with a pair of vertical type panels which are oppositely disposed, both inside of the entrance and exit door 1; a central processing unit 4 connected with the transmitting and receiving signal frequency coil portions TX1, TX2, RX1 and RX2; an image-receiving device 5; a warning flare and a photographing device 7 which are controlled by a central processing unit 4, characterized in that a small arms detecting transmitting coil portion TX1 and a commodity burglarproofing transmitting coil portion TX2 are interiorly installed at one side of the vertical type panel 3a of the above entrance and exit gate 2, respectively, while a small arms detecting receiving coil portion RX1 and a commodity burglarproofing receiving coil portion RX2 are interiorly installed at one side of the other vertical type panel 3b of the above entrance and exit gate 2, so that a variation existing between a frequency zone of small arms detecting transmitting and receiving coil portions TX1 and RX1 and the one of commodity burglarproofing transmitting and receiving coil portions TX2 and RX2 can be largely established, thereby resulting in no mutual interference.

In this connection, by interiorly installing a small arms detecting transmitting coil portion TX1 and a commodity burglarproofing transmitting coil portion TX2 at the one side of the vertical type panel 3a and a small arms detecting receiving coil portion RX1 and a commodity burglarproofing receiving coil portion RX2 at the other side of the vertical type panel 3b, a small arms detecting and commodity burglarproofing function may be displayed with only a single pair of the vertical type panels 3a and 3b. Accordingly, it is possible to reduce the size of the detachable entrance and exit gate according to the present invention by half of the conventional entrance and exit gate and to narrow greatly an installation area thereof.

In the meantime, a variation between a transmitting signal frequency and a receiving signal frequency may be established within the scope, in which a mutual interference may be avoided. For example, a frequency of commodity burglarproofing transmitting/receiving coil portions TX2, RX2 may be established with several MHz, and a frequency of small arms detecting transmitting/receiving coil portions TX1, RX1 may be established with several KHz.

The reference numbers 8 and 9 not shown in the Figures denote a warning flare and a speaker, respectively.

The operation of a detachable entrance and exit gate with a combined commodity burglarproofing and small arms detecting system according to the present invention will be explained in detail hereinbelow.

First of all, if any person bearing a small arms passes through the entrance and exit gate 2 comprising both side panels, when an electromagnetic field transmitted from a small arms detecting transmitting coil portion TX1 is received by a receiving coil portion RX1 of the other side panel, the small arms make a scatter of the electromagnetic field, and the scattered magnetic field is then received by the above receiving coil portion RX1. At this time, the width of variation of the electromagnetic field may be perceived by a central processing unit 4, and then analyzed in comparison with the previously inputted data. By doing so, it is possible to perceive the small arms.

Thereafter, a central processing unit 4 of the gate control device sends a signal to an image-receiving device 5 and a warning flare 6 through an antenna, and photographs and stores immediately the figures of a small arms-bearing person or a person who possesses any stole goods, and then informs a counter girl and the surrounding persons of such incidents.

On the other hand, a commodity burglarproofing system may be also operated by the same manner as described above. Namely, if any person who possesses any stolen goods, passes through the entrance and exit gate 2, the system is operated in the same manner as described above, informing a counter girl and/or surrounding persons of such incident by operating a warning flare 6 and a warning indication lamp 8, so that the burglary of goods can be prevented.

Additionally and/or alternatively to the above description, the small arms detecting system and/or the commodity burglarproofing detecting system may utilize any technology suitable for facilitating said detecting such as, for example, ultraviolet technologies, ultrasound technologies, heat sensing technologies, etc.

As stated above, since the entrance and exit gate with a combined commodity burglarproofing and small arms detecting system is structurally simple and detachable, the installation expense may be greatly reduced, and the general customers and persons passing through the entrance and exit gate do not receive psychological sense of oppression and feeling of rejection. Furthermore, the present entrance and exit gate may greatly narrow the installation area, thereby resulting in lowering greatly the production cost.

In addition, if necessary, the small arms detecting system of the present invention may be connected with an external security system of professional security providing companies.

Figure 2:
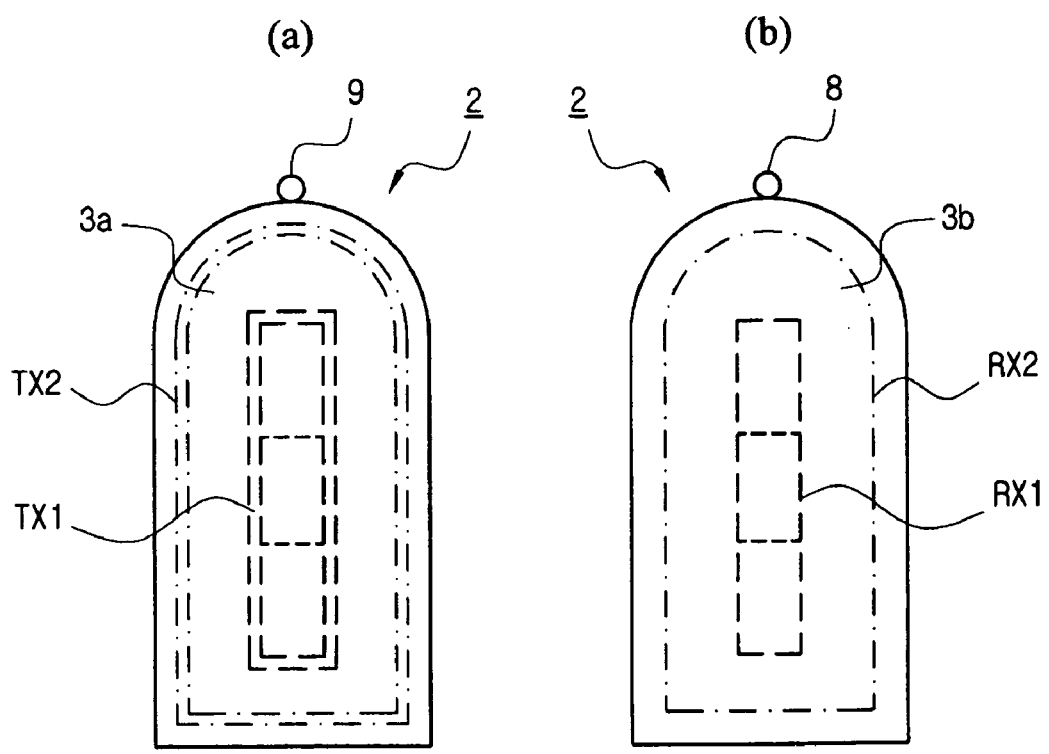
FIG. 2 is a front elevation view of a detachable entrance and exit gate forming the essential part of the present invention.

It will be understood that the invention contemplates the vertical panels 3a, 3b of the entrance/exit gate 2 having any desired shape and/or configuration. The panels 3a, 3b are shown in one exemplary embodiment of the invention in FIGS. 1 and 2 as comprising thin, generally planar, elongated members each having a substantially rectangular shape with an upper end having a curvilinear edge extending freely. Alternatively, the panels 3a, 3b may comprise a square, circular, or oval shape or any desired rectilinear or curvilinear shape or any combination thereof.

Although an entrance and exit gate with a combined commodity burglarproofing and small arms detecting systems has been described in connection with the preferred embodiment thereof shown in the accompanying drawings, it is a mere example of the present invention. It can also be understood by those skilled in the art that various changes and modifications thereof can be made thereto without departing from the scope and spirit of the present invention defined by the claims. Therefore, the true scope of the present invention should be defined by the technical sprit of the appended claims.

What is claimed is:

1. A detachable entrance and exit gate with a combined commodity burglarproofing and small arms detecting system, comprising:
    a detachable entrance and exit gate with a pair of vertical type panels which are oppositely disposed inside of an entrance and exit door;
    a central processing unit connected with transmitting and receiving signal frequency coil portions;
    an image-receiving device, a warning flare and a photographing device which are controlled by the central processing unit,
    wherein the transmitting and receiving coil portions comprise:
        a small arms detecting transmitting coil portion and a commodity burglarproofing transmitting coil portion interiorly installed at one of the vertical type panels of the entrance and exit gate; and
        a small arms detecting receiving coil portion and a commodity burglarproofing receiving coil portion interiorly installed at the other vertical type panel of the entrance and exit gate;
        wherein a variation existing between a frequency zone of the small arms detecting transmitting and receiving coil portions and a frequency zone of the commodity burglarproofing transmitting and receiving coil portions can be largely established, resulting in no mutual interference.

2. The detachable entrance and exit gate of claim 1, wherein the pair of vertical panels are thin, substantially planar, elongated rectilinear members having a curved upper end.

3. The detachable entrance and exit gate of claim 1, wherein the vertical panels each include a side having a rectilinear shape.

4. The detachable entrance and exit gate of claim 1, wherein the vertical panels each include a side having a curvilinear shape.

5. The detachable entrance and exit gate of claim 1, wherein the vertical panels each include a side having a combined rectilinear curvilinear shape.

6. The detachable entrance and exit gate of claim 1, wherein the gate comprises at least one of ultraviolet, ultrasound, and heating-sensing means to facilitate said detecting system.

7. A detachable entrance and exit gate with a combined commodity burglarproofing and small arms detecting system, comprising:
    a pair of oppositely disposed vertical panels;
    a small arms detecting transmitting coil portion;
    a commodity burglarproofing transmitting coil portion;
    a small arms detecting receiving coil portion; and
    a commodity burglarproofing receiving coil portion;
    wherein the small arms detecting transmitting coil portion and the commodity burglarproofing transmitting coil portion are both disposed at an interior of a first panel of the pair of vertical panels;
    wherein the small arms detecting receiving coil portion and the commodity burglarproofing receiving coil portion are both disposed at an interior of a second panel of the pair of vertical panels; and
    wherein the first panel includes a first upper end and the second panel includes a second upper end, the first and second upper ends extending freely, not connected to one another.

8. The detachable entrance and exit gate of claim 7, wherein a variation existing between a frequency zone of the small arms detecting transmitting and receiving coil portions and a frequency zone of the commodity burglarproofing transmitting and receiving coil portions can be largely established, resulting in no mutual interference.

9. The detachable entrance and exit gate of claim 7, wherein the pair of vertical panels are thin, substantially planar, elongated rectilinear members having a curved upper end.

10. The detachable entrance and exit gate of claim 7, wherein the vertical panels each include a side having a rectilinear and/or curvilinear shape.

* * * * *